March 8, 1938. R. POWELL 2,110,653
MICROSCOPE
Filed April 21, 1936
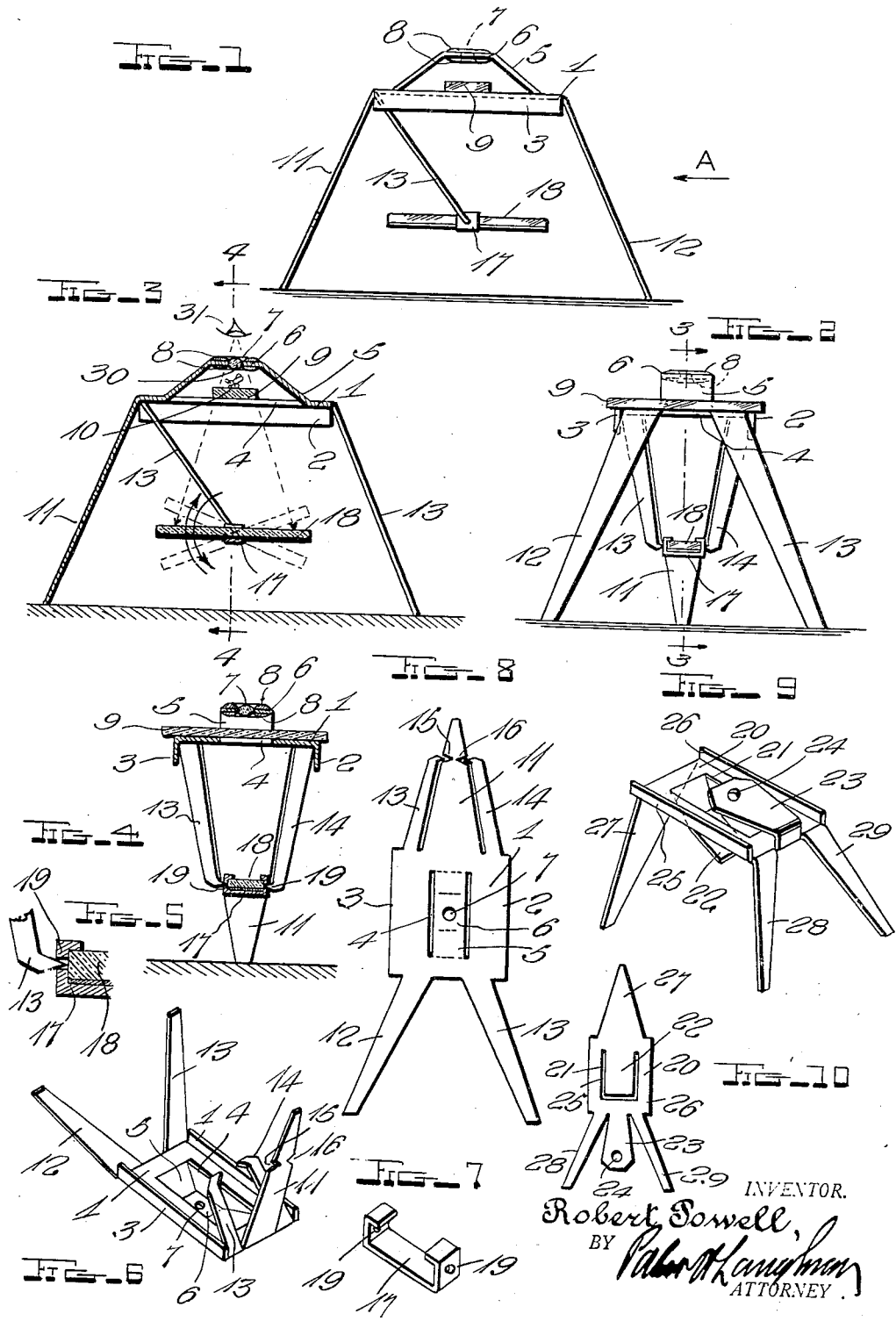

Patented Mar. 8, 1938

2,110,653

UNITED STATES PATENT OFFICE 2,110,653

MICROSCOPE

Robert Powell, Rupert, Idaho, assignor of one-half to Victor J. Smith, Burley, Idaho Application April 21, 1936, Serial No. 75,609

3 Claims. (Cl. 88—39)

My invention relates broadly to microscopes and more particularly to an inexpensive construction of microscope which may be readily manufactured on a quantity production basis from sheet metal.

One of the objects of my invention is to provide a construction of microscope of the general class set forth in my Patent 2,013,422, granted September 3, 1935, and which is of more simple construction and which can be produced more readily and at less cost than the construction of microscope illustrated in my aforesaid patent.

Another object of my invention is to provide a construction of microscope formed from a single piece of sheet metal and constituting a frame having supporting means thereon and means for supporting a lens, an object glass, and a mirror in compact association.

A further object of my invention is to provide a construction of microscope which may be produced as a stamping prepared from sheet metal and including a lens support, an object glass support, and a support for an adjustable mirror arranged in superimposed relation.

A still further object of my invention is to provide a construction of microscope constituted by a frame stamped from sheet metal and including an upwardly projecting lens support, a downwardly extending frame support, and an intermediate support for an adjustable mirror.

Other and further objects of my invention reside in the simplified construction of microscope set forth more fully in the specification hereinafter following by reference to the accompanying drawing, in which:

Fig. 1 is a side elevational view of the microscope of my invention; Fig. 2 is an end view of the microscope of my invention looking in the direction of the arrow A in Fig. 1; Fig. 3 is a central vertical sectional view taken on line 3—3 of Fig. 2; Fig. 4 is a transverse sectional view taken on line 4—4 of Fig. 3; Fig. 5 is a fragmentary sectional view of the mirror frame and arm for adjustably mounting the mirror frame; Fig. 6 is an inverted perspective view of the microscope, the view being inverted for the purpose of illustrating the details of construction of the frame of the microscope; Fig. 7 is a perspective view of the mirror frame; Fig. 8 is a plan view of the blank from which the frame and other integral parts of the microscope are formed; Fig. 9 is a perspective view of a modified construction of frame for a microscope in accordance with my invention; and Fig. 10 shows a blank stamped from sheet metal for the purpose of producing the frame illustrated in Fig. 9.

The microscope of my invention may be stamped from a single piece of sheet metal with all parts of the device, that is, the frame, the lens support, the object glass support, the support for the adjustable mirror, and the supporting legs of the frame, all formed integral. The device may be stamped from sheet metal and bent to shape inexpensively and utilized for observing small specimens with a high degree of magnification. The inexpensive construction of the microscope of my invention allows wider use of the microscope by students in the primary schools in the microscopic study of organisms and specimens.

Referring to the drawing in more detail, reference character 1 designates the frame stamped from sheet metal having a pair of downwardly directed side reinforcing longitudinally extending ribs 2 and 3 for imparting rigidity to the frame. The frame 1 is centrally apertured as represented at 4 and from the apertured portion, there is an outstruck upwardly projecting lens carrier portion 5. The lens carrier portion 5 has a flattened top portion 6 which is centrally apertured at 7 and is coated in an annular path about the central aperture 7 with paraffine, wax, or similar substance as represented at 8 both above and below the flattened surface 6 of the lens carrier portion 5. The apertured portion 4 of the frame 1 forms a supporting shelf across which the object glass 9 extends. The object glass 9 is a transparent plate on which the specimen 10 to be examined is placed. The object glass 9 is readily removable from the shelf-like support provided by frame 1 and may be slid into place on the flat table-like surface 1 beneath the lens carrier portion 5 either with or without the specimen 10 in position thereon.

The lens mold, constituted by the ring-like portions of wax, paraffine, or similar substance 8, provides means for retaining a globule of water or other fluid in a position in which a globule of fluid serves as a lens for the magnification of objects supported on the object glass immediately below.

The frame 1 is supported with respect to any suitable supporting surface or table by means of legs 11, 12 and 13 formed integrally with the material of the frame 1 and angularly bent to positions for suitably supporting the frame. It will be seen that the single leg 11 at one end of the blank is stamped to provide a pair of arms 13 and 14 conforming in contour to the shape of the leg 11 and provided with opposed V shaped notches 15 and 16, the material from which forms the terminating ends of the arms 13 and 14. It will be seen that the terminating ends of the arms 13 and 14 are directed toward each other and are each provided with relatively sharp points. When the arms 13 and 14 are bent downwardly to a position terminating along a central vertical axis through the frame of the microscope, the pointed ends of the arms 13 and 14 which are directed toward each other, enter aperture 19 in the band-like frame 17 which engages the mirror 18. The band 17 provides a supporting means for the mirror 18. The pointed ends of the arms 13 and 14 may be bent toward each other in order to enter and engage the apertures 19 in the band-like frame 17. Because of the inherent resiliency in the sheet material of the frame, arms 13 and 14 tend to spring together and to subject the band-like frame 17 to sufficient tension to allow the mirror 18 to be retained in that angular position to which the mirror may be adjusted. I have illustrated in Fig. 3 the various angular positions to which mirror 18 may be adjusted as represented in dotted lines. The mirror 18 may be moved to any of the angular positions thus selected and maintained in such position by the inherent lateral tension between the ends of arms 13 and 14 which enter apertures 19 in the band-like support 17.

It will be seen that all parts of the frame of the microscope are formed from the sheet metal stamping cut to the shape illustrated in the blank of Fig. 8.

It is quite possible to form the microscope of my invention by other methods and for this purpose, I have illustrated in Figs. 9 and 10 a modified form of the microscope of my invention. The frame of the modified construction of device is illustrated by reference character 20, apertured at 21, from which the depending member 22 is struck. The depending member 22 serves as a supporting means for a reflecting surface or mirror. The frame 20 has a longitudinal extension 23 formed thereon which may be bent over the upper portion of the frame and in alignment with the central vertical axis of the frame with an aperture 24 in the portion 23 which serves as a support for the wax, paraffine, or other substance both above and below the aperture 24. To preserve the rigidity of the frame, I provide longitudinally extending, upwardly projecting rib portions 25 and 26. Downwardly projecting supporting feet 27, 28 and 29 are provided for mounting the frame on any suitable surface. The object glass may be supported on the surface 28 and extended across the apertured portion 21. Light may be reflected from the mirror secured on depending member 22, through the object glass for allowing observation to be made through the globule of water or fluid retained in aperture 24. The depending member 22 may be bent to any suitable position to insure the proper angular disposition of the reflecting mirror carried thereby. The reflecting member is adapted to be supported by cement, glue, or through some other suitable adhesive medium on depending member 22.

In the use of the microscope of my invention, the frame is set up in a position so as to obtain strong light reflection. A small drop of water or other fluid is placed by means of an applicator, such as the head of a small nail, in the lens mold as indicated at 30 in Fig. 3. The specimen or object under observation indicated at 10 is placed on the object glass 9 immediately below the globule of water or fluid as shown at 30. The mirror 18 is angularly adjusted to reflect the required light through the object glass to the globule of water or fluid 30. The observer now places the eye in the relative position indicated at 31 close to the lens formed by the globule of water or other fluid. A remarkably large and clear image of the specimen under observation may be seen. With the instrument properly set up, a remarkably high degree of magnification is possible. Greater clarity may be obtained by trimming the lens, that is, by removing or adding a minute quantity of water or other fluid to the lens. The mirror is adjustable to various angular positions to insure the maximum possible reflection of light through the object glass to the eye of the observer.

I have found the microscope of my invention highly practical in its construction and successful in its operation. While I have described my invention in certain of its preferred embodiments, I desire that it be understood that modifications may be made and that no limitations upon my invention are intended other than are imposed by the scope of the appended claims.

What I claim as new and desire to secure by Letters Patent of the United States is as follows:

1. A microscope constructed from sheet metal and comprising a centrally apertured table portion, a multiplicity of supporting legs integral therewith, a lens carrier portion integral with and projecting upwardly from said table portion, a lens mold supported by said lens carrier portion for retaining a liquid globule centrally in said lens carrier portion serving as an optical lens, said table portion being arranged to receive an object glass disposed beneath said lens carrier portion, a reflecting mirror, and a pair of arms formed integrally in the sheet metal adjacent one of said legs, said arms extending beneath said table portion and terminating in ends directed toward each other and adapted to adjustably mount said reflecting mirror in a position beneath said table portion for reflecting light through the apertured table portion, the object glass and the liquid globule to the eye of an observer.

2. A microscope comprising a sheet metal frame including a centrally apertured table portion and a plurality of supporting legs integral with and depending from said table portion, a lens carrier portion integral with and projecting upwardly from said table portion, a lens supported by said lens carrier portion, said table portion operating to receive an object glass disposed beneath said lens carrier portion and a pair of arms integrally connected with said table portion and extending downwardly at an acute angle thereto to a position aligned with a vertical axis through the lens, the object glass and the apertured table portion, an adjustable mirror disposed between the said arms, and a pair of longitudinally extending ribs formed in the sheet metal of said table portion for increasing the rigidity of said frame.

3. A microscope comprising a sheet metal frame including a centrally apertured table portion and a plurality of supporting legs integral with and depending from said table portion, a lens carrier portion integral with and projecting upwardly from said table portion, a lens supported by said lens carrier portion, said table portion operating to receive an object glass disposed beneath said lens carrier portion and a pair of arms integrally connected with said table portion and extending downwardly at an acute angle thereto to a position aligned with a vertical axis through the lens, the object glass and the apertured table portion, and an adjustable mirror disposed between the said arms, said table portion having opposite longitudinally extending edges thereof bent downwardly to provide means for increasing the rigidity of said table portion.

ROBERT POWELL.